(12) United States Patent
Zhang et al.

(10) Patent No.: US 11,181,788 B2
(45) Date of Patent: Nov. 23, 2021

(54) DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Yinfeng Zhang, Shenzhen (CN); Yunglun Lin, Shenzhen (CN); Xuan Li, Shenzhen (CN); Yihe Zhang, Shenzhen (CN); Wu Cao, Shenzhen (CN)

( * ) Notice: Subject to any disclaimer, the term of this patent is extended or adjusted under 35 U.S.C. 154(b) by 211 days.

(21) Appl. No.: 16/627,780

(22) PCT Filed: Dec. 24, 2019

(86) PCT No.: PCT/CN2019/127712
§ 371 (c)(1),
(2) Date: Dec. 31, 2019

(87) PCT Pub. No.: WO2021/114388
PCT Pub. Date: Jun. 17, 2021

(65) Prior Publication Data
US 2021/0333656 A1    Oct. 28, 2021

(30) Foreign Application Priority Data

Dec. 12, 2019    (CN) .......................... 201911270641.8

(51) Int. Cl.
*G02F 1/1368*    (2006.01)
*G02F 1/1343*    (2006.01)
*G02F 1/1362*    (2006.01)

(52) U.S. Cl.
CPC ...... *G02F 1/134345* (2021.01); *G02F 1/1368* (2013.01); *G02F 1/136209* (2013.01); *G02F 1/136286* (2013.01)

(58) Field of Classification Search
None
See application file for complete search history.

(56) References Cited

U.S. PATENT DOCUMENTS

2016/0195788 A1*    7/2016    Bae .................. G02F 1/136286
                                                                   257/72
2019/0146284 A1    5/2019    Bae et al.

FOREIGN PATENT DOCUMENTS

CN        105759518 A      7/2016
CN        107272281 A      10/2017
(Continued)

OTHER PUBLICATIONS

CN 107203074 translation (Year: 2017).*

*Primary Examiner* — James A Dudek

(57) ABSTRACT

The present invention provides a display panel including a plurality of sub-pixels. Each of the sub-pixels includes a main region and a sub-region. Each of the sub-pixels includes pixel electrodes disposed in the main region and the sub-region. Each of the pixel electrodes includes a backbone portion and a plurality of branch portions connected to the backbone portion. One of the sub-pixels in each of the pixel units includes a shared electrode and a light shielding layer. The shared electrode extends from the main region of the one of the sub-pixels to the sub-region of the one of the sub-pixels. The light-shielding layer is disposed in the main region and the sub-region of the one of the sub-pixels.

20 Claims, 2 Drawing Sheets

(56) References Cited

FOREIGN PATENT DOCUMENTS

| CN | 109613774 A | 4/2019 |
|----|-------------|--------|
| CN | 109799657 A | 5/2019 |
| CN | 110308597 A | 10/2019 |
| CN | 110346987 A | 10/2019 |

* cited by examiner

DISPLAY PANEL

FIELD OF INVENTION

The present invention relates to the technical field of display panels, and in particular, to a display panel.

BACKGROUND OF INVENTION

With gradual promotions of high-definition displays, major panel manufacturers are scrambling to lay out key display technologies such as high resolution and low color cast, and 3T technology and data line BM less (DBS) technologies have gradually appeared. 3T+&8domain (8 domain 3 transistors) designs have received wide attention due to their excellent color shift performance, which make four domains of a main region and four domains of a sub-region in a same sub pixel to have different rotation angles, thereby improving color shift.

The 3T technologies are that three TFT switches are controlled by a same gate line. When a gate electrode is turned on, two of TFTs charge a main region and a sub-region of a pixel electrode, while a third TFT leaks a portion of a charge that has been charged into the sub-region to a common electrode line of an array substrate, pulling down a potential of the sub-region. That is to improve a large viewing angle by ensuring a potential difference between the main region and the sub-region.

At the same time, in order to reduce production costs, four photomask processes are also widely used. Because four photomasks integrate an active layer and a second metal layer as a photomask, due to limitations of process technologies, the active layer will be slightly wider than the second metal layer, which limits layouts of the second metal layer and affects aperture ratios. At the same time, a shared electrode in the second metal layer is in direct contact with the active layer, and photo-generated carriers will be generated under light, which affects a stability of the shared electrode and adversely affects a display panel.

Please refer to FIG. 1. FIG. 1 is a schematic structural view of a display panel provided in the prior art, which comprising a plurality of pixel units. Each of the pixel units has a red sub-pixel 10, a green sub-pixel 30, and a blue sub-pixel 20, and each of the sub-pixels has a main region 101 and a sub-region 102. Each of the sub-pixels has pixel electrodes 100 disposed in the main region 101 and the sub-region 102. A scan line 400 is disposed for each row of the sub-pixels, and the scan line 400 is disposed between the main region 101 and the sub-region 102. A data line 500 is disposed for each column of the sub-pixels. The red sub-pixel 10, the green sub-pixel 30, and the blue sub-pixel 20 have a shared electrode 200 and a light-shielding layer 300. The light-shielding layer slightly wider than the shared electrode and the active layer is retained for light shielding, thereby avoiding a generation of photo-generated carriers to improve the stability of the shared electrode. The DBS technologies specifically do not have a black matrix above the data line 400, but liquid crystals are not deflected to achieve light shielding through the electrode line 40 applied with a common voltage.

Although an optical stability can be improved by retaining designs of the light-shielding layer, physical light-shielding properties of the light-shielding layer also lead to a further reduction in the aperture ratios, which seriously limits a transmittance and cannot meet high transmittance requirements under high-resolution conditions, which in turn affects the production and application of high resolution and low color shift technology, and is not conducive to the occupation of the high-end market.

Therefore, it is necessary to develop a new type of display panel to overcome the defects of the current technologies.

Technical Problem

An object of the present invention is to provide a display panel capable of solving problems of low aperture ratios of display panels in the prior art.

Technical Solution

To achieve the above object, the present invention further provides a display panel comprising a plurality of pixel units, wherein each of the pixel units comprises a plurality of sub-pixels, and each of the sub-pixels comprises a main region and a sub-region; wherein each of the sub-pixels comprises pixel electrodes disposed in the main region and the sub-region, each of the pixel electrodes comprises a backbone portion and a plurality of branch portions connected to the backbone portion; wherein one of the sub-pixels in each of the pixel units comprises a shared electrode and a light shielding layer, the shared electrode extends from the main region of the one of the sub-pixels to the sub-region of the one of the sub-pixels, and the light-shielding layer is disposed in the main region and the sub-region of the one of the sub-pixels; and wherein in the main region and the sub-region of the one of the sub-pixels, the shared electrode is correspondingly provided above the backbone portion, and the light shielding layer is correspondingly provided below the backbone portion.

Further, in other embodiments, wherein each of the pixel units comprises a red sub-pixel, a green sub-pixel, and a blue sub-pixel, and the blue sub-pixel comprises the shared electrode and the light shielding layer.

Further, in other embodiments, wherein a scan line is disposed for each row of the sub-pixels, the scan line is disposed between the main region and the sub-region, and a data line is disposed for each column of the sub-pixels.

Further, in other embodiments, wherein the main region and the sub-region of the sub-pixel further comprise a common electrode and a storage electrode, the common electrode and the storage electrode of the main region form a main region storage capacitor, and the common electrode and the storage electrode of the sub-region form a sub-region storage capacitor.

Further, in other embodiments, wherein the sub-pixel further comprises a first thin film transistor connected to the branch portion in the main region and a second thin film transistor connected to the branch portion in the sub-region, the first thin film transistor and the second thin film transistor are disposed between the main region and the sub-region, and gate electrodes of the first thin film transistor and the second thin film transistor are connected to the scan line.

Further, in other embodiments, further comprises a transparent electrode and a second metal layer, wherein a shared line is connected to the second metal layer in the red sub-pixel and the green sub-pixel through the transparent electrode.

Further, in other embodiments, wherein a black matrix is disposed on the data line.

Further, in other embodiments, wherein a width of the black matrix is greater than a width of the data line.

Further, in other embodiments, wherein the backbone portion comprises a horizontal backbone portion and a vertical backbone portion, the shared electrode is disposed on the vertical backbone portion of the main region and the sub-region of the pixel electrode, and the light-shielding layer is correspondingly disposed below the vertical backbone portion.

Further, in other embodiments, wherein the backbone portion comprises a first vertical backbone portion and a first horizontal backbone portion disposed in the main region of the sub-pixel, and a second vertical backbone portion and a second horizontal backbone portion disposed in the sub-region of the sub-pixel; wherein the first vertical backbone portion and the first horizontal backbone portion divide the pixel electrode in the main region into 4 domains, and the second vertical backbone portion and the second horizontal backbone portion divide the pixel electrode in the sub-region into 4 domains.

Beneficial Effect

Compared with the prior art, beneficial effects of the present invention are: The present invention provides a display panel. By removing shared electrodes and light-shielding layers in a main region and a sub-region of a red sub-pixel and a green sub-pixel, the shared electrodes and the light-shielding layers in the blue sub-pixel are unchanged. A transparent electrode wire is used to connect the shared electrode in a blue sub-pixel with a second metal layer in the red sub-pixel and the green sub-pixel through an opening, and a voltage division function of the red sub-pixel and the green sub-pixel is retained. This design releases physical shading spaces of the red sub-pixel and the green sub-pixel, and can achieve an aperture ratio increase of about 5%. If an actual width of a central dark line is considered, the increase will reach about 6.3%. An effective increase of the aperture ratio will promote a significant improvement of a transmittance; retaining the shared electrode in the blue sub-pixel can also improve a color spectrum by 3%, effectively improving the color shift.

At the same time, because the transparent electrode line occupies a DBS design channel, the DBS design is replaced with a black matrix design. A black matrix is disposed above a data line, a width of the black matrix is slightly wider than a width of the data line, and the black matrix covers some of common electrodes next to the data line. This design achieves higher contrast.

DESCRIPTION OF DRAWINGS

The following detailed description of specific embodiments of the present invention will make the technical solution and other beneficial effects of the present invention obvious in conjunction with the accompanying drawings.

Figure 1:
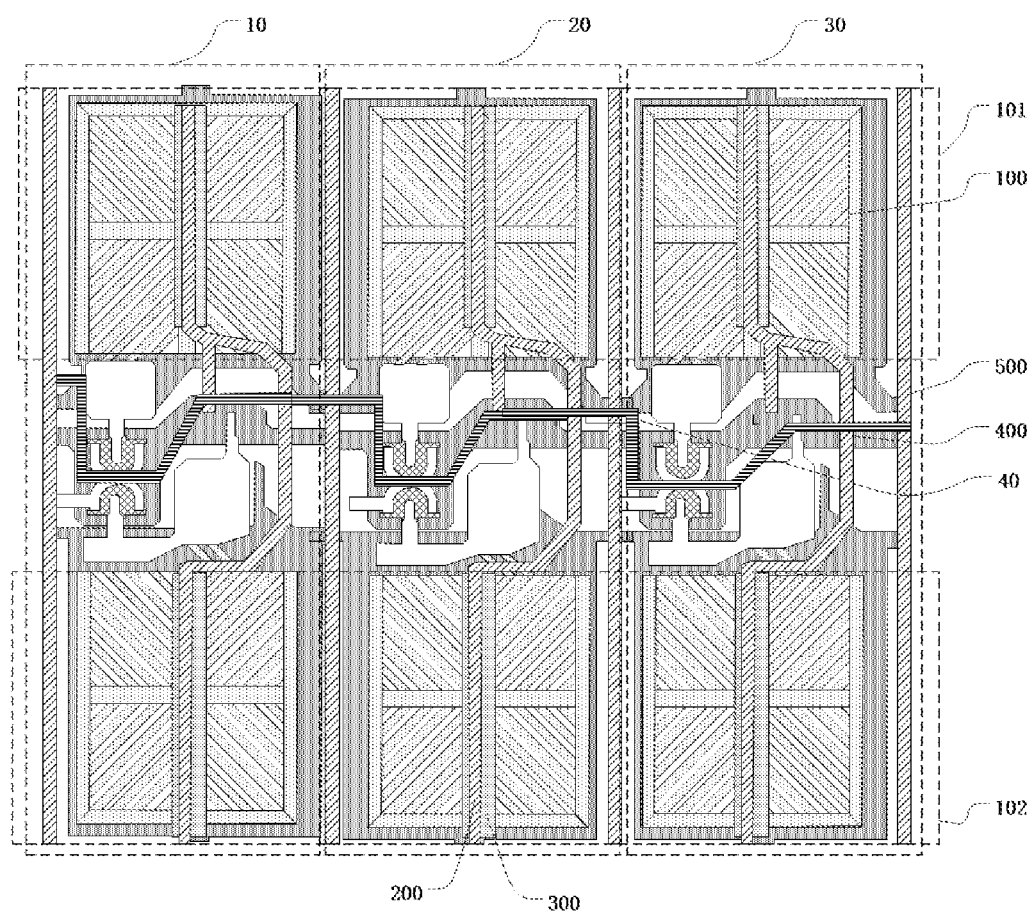
FIG. 1 is a schematic structural view of a display panel provided in the prior art.

REFERENCE NUMERALS IN THE BACKGROUND red sub-pixel: 10,
blue sub-pixel: 20;
green sub-pixel: 30;
main region: 101;
sub-region: 102;
pixel electrode: 100;
shared electrode: 200;
light-shielding layer: 300;
scan line: 400;
data line: 500;
transparent electrode: 40;

REFERENCE NUMERALS IN THE EMBODIMENTS red sub-pixel: 10,
blue sub-pixel: 20;
green sub-pixel: 30;
main region: 101;
sub-region: 102;
pixel electrode: 100;
backbone portion: 110; branch portion: 120;
horizontal backbone portion: 111;
vertical backbone portion: 112;
first horizontal backbone portion: 1111;
second horizontal backbone portion: 1112;
first vertical backbone portion: 1121;
second vertical backbone portion: 1122;
shared electrode: 200;
light-shielding layer: 300;
scan line: 400;
data line: 500;
black matrix: 510;
common electrode: 600;
first thin film transistor: 700;
second thin film transistor: 800;
transparent electrode: 900;
second metal layer: 910

DETAILED DESCRIPTION OF PREFERRED EMBODIMENTS

The technical solution in the embodiments of the present invention will be clearly and completely described below with reference to the accompanying drawings in the embodiments of the present invention. It is to be understood that the described embodiments are merely exemplary of the invention, and not restrictive of the full scope of the invention. All other embodiments, which can be obtained by a person skilled in the art without inventive step based on the embodiments of the present invention, are within the scope of the present invention.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise.

In the description of the present invention, it is to be noted that, unless otherwise explicitly specified or limited, the terms "mounted," "connected," and "linked" are to be construed broadly, e.g., as meaning either a fixed connection, a removable connection, or an integral connection; may be mechanically connected, may be electrically connected or may be in communication with each other; either directly or indirectly through intervening media, either internally or in any other relationship. The specific meaning of the above terms in the present invention can be understood by those of ordinary skill in the art as appropriate.

In the present invention, unless otherwise specifically defined and defined, the first feature is "on" or "under" the second feature may include that the first feature is in direct contact to the second feature, and may also include that the first feature and the second feature are not in direct contact but through additional features between them. Moreover, the first feature is "on," "above," and "under" the second feature includes the first feature is directly above and obliquely above the second feature, or merely indicating that the high of the first feature is higher than the second feature. The first feature is "below," "under," and "lower" the second feature includes the first feature is directly below and obliquely below the second feature, or merely indicating that the high of the first feature is less than the second feature.

The following disclosure provides many different embodiments or examples for implementing different features of the invention. In order to simplify the disclosure of the present invention, specific example components and arrangements are described below. Of course, they are merely examples and are not intended to limit the present invention. Moreover, the present invention may repeat reference numerals and/or letters in the various examples, such repetition is for the purpose of simplicity and clarity and does not in itself dictate a relationship between the various embodiments and/or configurations discussed. In addition, examples of various specific processes and materials are provided herein, but one of ordinary skill in the art may recognize applications of other processes and/or uses of other materials.

Figure 2:
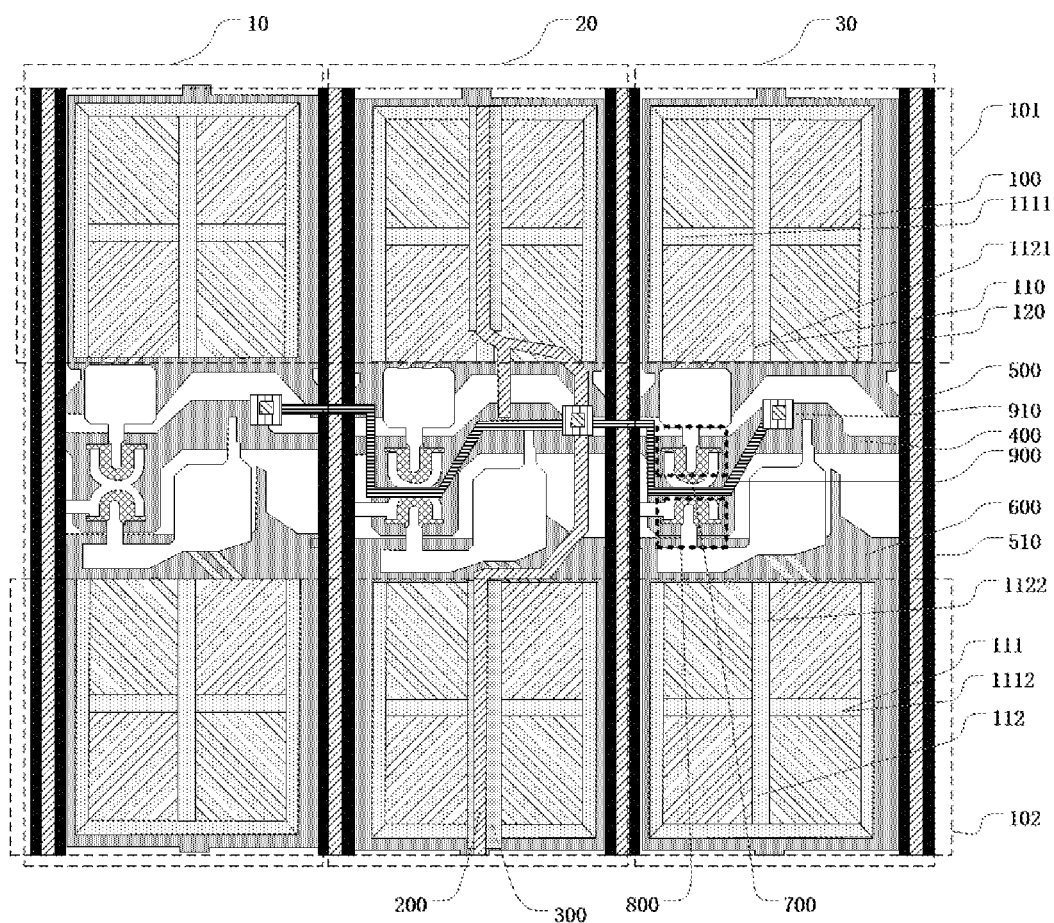
FIG. 2 is a schematic structural view of a display panel according to an embodiment of the present invention.

Specifically, please refer to FIG. 2, which is a schematic structural view of a display panel according to an embodiment of the present invention. An embodiment of the present invention provides a display panel comprising a plurality of pixel units. Each of the pixel units comprises a red sub-pixel 10, a green sub-pixel 20, and a blue sub-pixel 30, and each of the sub-pixels comprises a main region 101 and a sub-region 102.

Each of the sub-pixels comprises pixel electrodes 100 disposed in the main region 101 and the sub-region 102. Each of the pixel electrodes 100 comprises a backbone portion 110 and a plurality of branch portions 120 connected to the backbone portion 110. The backbone portion 110 comprises a horizontal backbone portion 111 and a vertical backbone portion 112.

The backbone portion 110 comprises a first vertical backbone portion 1121 and a first horizontal backbone portion 1111 disposed in the main region 101 of the sub-pixel, and a second vertical backbone portion 1122 and a second horizontal backbone portion 1112 disposed in the sub-region 102 of the sub-pixel. The first vertical backbone portion 1121 and the first horizontal backbone portion 1111 divide the pixel electrode 100 in the main region 101 into four (4) domains, and the second vertical backbone portion 1122 and the second horizontal backbone portion 1112 divide the pixel electrode 100 in the sub-region 102 into four (4) domains.

A scan line 400 is disposed for each row of the sub-pixels. The scan line 400 is disposed between the main region 101 and the sub-region 102. A data line 500 is disposed for each column of the sub-pixels.

The main region 101 and the sub-region 102 of the sub-pixel further comprise a common electrode 600 and a storage electrode. The common electrode 600 and the storage electrode of the main region 101 form a main region storage capacitor, and the common electrode 600 and the storage electrode of the sub-region 102 form a sub-region storage capacitor.

The sub-pixel further comprises a first thin film transistor 700 connected to the branch portion 120 in the main region 101 and a second thin film transistor 800 connected to the branch portion 120 in the sub-region 102. The first thin film transistor 700 and the second thin film transistor 800 are disposed between the main region 101 and the sub-region 102, and gate electrodes of the first thin film transistor 700 and the second thin film transistor 800 are connected to the scan line 400. A source-drain electrode can be connected to the data line 500 by turning on the thin film transistor.

The blue sub-pixel 20 comprises a shared electrode 200 and a light shielding layer 300. The shared electrode 200 extends from the main region 101 of the blue sub-pixel 20 to the sub-region 102 of the blue sub-pixel 20. The light-shielding layer 300 is disposed in the main region 101 and the sub-region 102 of the blue sub-pixel 20. In the main region 101 and the sub-region 102 of the blue sub-pixel 20, the shared electrode 200 is disposed above the vertical backbone portion 112, and the light shielding layer 300 is disposed below the vertical backbone portion 112.

The display panel further comprises a transparent electrode 900 and a second metal layer 910. A shared line is connected to the second metal layer 910 in the red sub-pixel 10 and the green sub-pixel 30 through the transparent electrode 900. The display panel further comprises a third thin film transistor. The second metal layer 910 is connected to a drain electrode of the second transistor only through the third thin film transistor. The data line 500 and the source-drain electrode both belong to the second metal layer.

By removing the shared electrodes and the light-shielding layers in the main region and sub-region of the red sub-pixel and the green sub-pixel, the shared electrodes and the light-shielding layers in the blue sub-pixel are unchanged. A transparent electrode wire is used to connect the shared electrode in the blue sub-pixel with the second metal layer in the red sub-pixel and a green sub-pixel through an opening, and a voltage division function of the red sub-pixel and the green sub-pixel is retained. This design releases physical shading spaces of the red sub-pixel and the green sub-pixel, and can achieve an aperture ratio increase of about 5%. If an actual width of a central dark line is considered, the increase will reach about 6.3%. An effective increase of the aperture ratio will promote a significant improvement of a transmittance.

Because the transparent electrode line 900 occupies a DBS design channel, the DBS design is replaced with a black matrix design. A black matrix 510 is disposed above the data line 500, a width of the black matrix 510 is larger than a width of the data line 500, and the black matrix 510 covers part of the common electrode 600 next to the data line 500.

The beneficial effects of the present invention are: The present invention provides the display panel. By removing the shared electrodes and the light-shielding layers in the main region and the sub-region of the red sub-pixel and the green sub-pixel, the shared electrodes and the light-shielding layers in the blue sub-pixel are unchanged. The transparent electrode wire is used to connect the shared electrode in the blue sub-pixel with the second metal layer in the red sub-pixel and the green sub-pixel through the opening, and the voltage division function of the red sub-pixel and the green sub-pixel is retained. The design releases the physical shading spaces of the red sub-pixel and the green sub-pixel, and can achieve the aperture ratio increase of about 5%. If the actual width of the central dark line is considered, the increase will reach about 6.3%. The effective increase of the aperture ratio will promote the significant improvement of the transmittance; retaining the shared electrode in the blue sub-pixel can also improve the color spectrum by 3%, effectively improving the color shift.

At the same time, because the transparent electrode line occupies the DBS design channel, the DBS design is replaced with the black matrix design. The black matrix is disposed above the data line, the width of the black matrix is slightly larger than the width of the data line, and the black matrix covers some of the common electrodes next to the data line. This design achieves higher contrast.

In the above embodiments, the description of each embodiment has its own emphasis. For a part that is not described in detail in one embodiment, refer to the description of other embodiments.

The display panel provided by the embodiments of the present invention have been described in detail above. In the above, various other corresponding changes and modifications can be made according to the technical solutions and technical ideas of the present invention to those skilled in the art, and all such changes and modifications are within the scope of the claims of the present invention.

What is claimed is:

1. A display panel, comprising:
    a plurality of pixel units, wherein each of the pixel units comprises a plurality of sub-pixels, and each of the sub-pixels comprises a main region and a sub-region;
    wherein each of the sub-pixels comprises pixel electrodes disposed in the main region and the sub-region, each of the pixel electrodes comprises a backbone portion and a plurality of branch portions connected to the backbone portion;
    wherein one of the sub-pixels in each of the pixel units comprises a shared electrode and a light shielding layer, the shared electrode extends from the main region of the one of the sub-pixels to the sub-region of the one of the sub-pixels, and the light-shielding layer is disposed in the main region and the sub-region of the one of the sub-pixels; and
    wherein in the main region and the sub-region of the one of the sub-pixels, the shared electrode is correspondingly provided above the backbone portion, and the light shielding layer is correspondingly provided below the backbone portion.

2. The display panel as claimed in claim 1, wherein each of the pixel units comprises a red sub-pixel, a green sub-pixel, and a blue sub-pixel, and the blue sub-pixel comprises the shared electrode and the light shielding layer.

3. The display panel as claimed in claim 2, wherein a scan line is disposed for each row of the sub-pixels, the scan line is disposed between the main region and the sub-region, and a data line is disposed for each column of the sub-pixels.

4. The display panel as claimed in claim 1, wherein the main region and the sub-region of the sub-pixel further comprise a common electrode and a storage electrode, the common electrode and the storage electrode of the main region form a main region storage capacitor, and the common electrode and the storage electrode of the sub-region form a sub-region storage capacitor.

5. The display panel as claimed in claim 3, wherein the sub-pixel further comprises a first thin film transistor connected to the branch portion in the main region and a second thin film transistor connected to the branch portion in the sub-region, the first thin film transistor and the second thin film transistor are disposed between the main region and the sub-region, and gate electrodes of the first thin film transistor and the second thin film transistor are connected to the scan line.

6. The display panel as claimed in claim 5, further comprising a transparent electrode and a second metal layer, wherein a shared line is connected to the second metal layer in the red sub-pixel and the green sub-pixel through the transparent electrode.

7. The display panel as claimed in claim 3, wherein a black matrix is disposed on the data line.

8. The display panel as claimed in claim 7, wherein a width of the black matrix is greater than a width of the data line.

9. The display panel as claimed in claim 1, wherein the backbone portion comprises a horizontal backbone portion and a vertical backbone portion, the shared electrode is disposed on the vertical backbone portion of the main region and the sub-region of the pixel electrode, and the light-shielding layer is correspondingly disposed below the vertical backbone portion.

10. The display panel as claimed in claim 9, wherein the backbone portion comprises a first vertical backbone portion and a first horizontal backbone portion disposed in the main region of the sub-pixel, and a second vertical backbone portion and a second horizontal backbone portion disposed in the sub-region of the sub-pixel; wherein the first vertical backbone portion and the first horizontal backbone portion divide the pixel electrode in the main region into 4 domains, and the second vertical backbone portion and the second horizontal backbone portion divide the pixel electrode in the sub-region into 4 domains.

11. A display device, comprising:
    a display panel as claimed in claim 1.

12. The display device as claimed in claim 11, wherein each of the pixel units comprises a red sub-pixel, a green sub-pixel, and a blue sub-pixel, and the blue sub-pixel comprises the shared electrode and the light shielding layer.

13. The display device as claimed in claim 12, wherein a scan line is disposed for each row of the sub-pixels, the scan line is disposed between the main region and the sub-region, and a data line is disposed for each column of the sub-pixels.

14. The display device as claimed in claim 11, wherein the main region and the sub-region of the sub-pixel further comprise a common electrode and a storage electrode, the common electrode and the storage electrode of the main region form a main region storage capacitor, and the common electrode and the storage electrode of the sub-region form a sub-region storage capacitor.

15. The display device as claimed in claim 13, wherein the sub-pixel further comprises a first thin film transistor connected to the branch portion in the main region and a second thin film transistor connected to the branch portion in the sub-region, the first thin film transistor and the second thin film transistor are disposed between the main region and the sub-region, and gate electrodes of the first thin film transistor and the second thin film transistor are connected to the scan line.

16. The display device as claimed in claim 15, further comprising a transparent electrode and a second metal layer, wherein a shared line is connected to the second metal layer in the red sub-pixel and the green sub-pixel through the transparent electrode.

17. The display device as claimed in claim 13, wherein a black matrix is disposed on the data line.

18. The display device as claimed in claim 17, wherein a width of the black matrix is greater than a width of the data line.

19. The display device as claimed in claim 11, wherein the backbone portion comprises a horizontal backbone portion and a vertical backbone portion, the shared electrode is disposed on the vertical backbone portion of the main region and the sub-region of the pixel electrode, and the light-shielding layer is correspondingly disposed below the vertical backbone portion.

20. The display device as claimed in claim 19, wherein the backbone portion comprises a first vertical backbone portion and a first horizontal backbone portion disposed in the main region of the sub-pixel, and a second vertical backbone portion and a second horizontal backbone portion disposed in the sub-region of the sub-pixel; wherein the first vertical backbone portion and the first horizontal backbone portion divide the pixel electrode in the main region into 4 domains, and the second vertical backbone portion and the second horizontal backbone portion divide the pixel electrode in the sub-region into 4 domains.

* * * * *